(12) United States Patent
Yang et al.

(10) Patent No.: US 11,796,208 B2
(45) Date of Patent: Oct. 24, 2023

(54) INDOOR PERSONNEL INFORMATION IDENTIFYING APPARATUS AND METHOD FOR ASSISTING AIR CONDITIONING SYSTEM OF ON-DEMAND AIR SUPPLY

(71) Applicants: Tianjin Chengjian University, Tianjin (CN); Xi'an University of Architecture and Technology, Xi'an (CN)

(72) Inventors: Bin Yang, Tianjin (CN); Dacheng Jin, Tianjin (CN); Yihang Liu, Tianjin (CN); Pengju Liu, Tianjin (CN); Bingan Pan, Tianjin (CN); Pengfei Yang, Tianjin (CN)

(73) Assignees: TIANJIN CHENGJIAN UNIVERSITY, Tianjin (CN); XI'AN UNIVERSITY OF ARCHITECTURE AND TECHNOLOGY, Xi'An City (CN)

(*) Notice: Subject to any disclaimer, the term of this patent is extended or adjusted under 35 U.S.C. 154(b) by 78 days.

(21) Appl. No.: 17/564,840

(22) Filed: Dec. 29, 2021

(65) Prior Publication Data
US 2023/0030722 A1  Feb. 2, 2023

(30) Foreign Application Priority Data
Jul. 28, 2021  (CN) ............................ 202110860073.8

(51) Int. Cl.
F24F 11/49  (2018.01)
F24F 11/72  (2018.01)
G06V 40/10  (2022.01)

(52) U.S. Cl.
CPC ............... *F24F 11/72* (2018.01); *F24F 11/49* (2018.01); *G06V 40/10* (2022.01)

(58) Field of Classification Search
CPC .......... F24F 11/49; F24F 11/72; G06V 40/10
See application file for complete search history.

(56) References Cited

FOREIGN PATENT DOCUMENTS

| KR | 20190065636 A | * | 6/2019 | |
| WO | 2017099527 A1 | * | 6/2017 | ............... A61B 5/01 |

* cited by examiner

Primary Examiner — Mark A Connolly
(74) Attorney, Agent, or Firm — WPAT, P.C

(57) ABSTRACT

Indoor personnel information identifying apparatus and method for assisting an air conditioning system of on-demand air supply are provided, the apparatus includes a data acquisition device, an information processing device and an information display device, the data acquisition device is configured to acquire weight information and shoe image information of personnel in real time, the information processing device is configured to predict an total calorific value of indoor personnel according to a real-time number of indoor personnel and obtain recommended air supply parameter information for the air conditioning system according to the total calorific value, the information display device is configured to receive and display personnel information processed by the data acquisition device and the information processing device and the recommended air supply parameter information. The apparatus can achieve an effect of reducing energy consumption under conditions of ensuring good indoor air quality and high personnel comfort.

10 Claims, 2 Drawing Sheets

US 11,796,208 B2

INDOOR PERSONNEL INFORMATION IDENTIFYING APPARATUS AND METHOD FOR ASSISTING AIR CONDITIONING SYSTEM OF ON-DEMAND AIR SUPPLY

TECHNICAL FIELD

The disclosure relates to the technical field of personnel identification, in particular to indoor personnel information identifying apparatus and method for assisting an air conditioning system of on-demand air supply.

DESCRIPTION OF RELATED ART

Building energy consumption accounts for about 40% of the world's total energy consumption, of which the consumption of heating, ventilating and air conditioning (HVAC) system accounts for about 40%. With the improvement of people's living standards, people have higher and higher requirements for the comfort of indoor environment. The traditional ventilation and air conditioning system is determined according to the ventilation demand corresponding to the specific environment and building area of a building. Its disadvantage is that the air supply volume has been determined in the early stage of design, and the fresh air volume of the total air supply volume is also determined according to the most unfavorable working conditions, which cannot be changed in time according to the change of the actual quantity of personnel in the building. Therefore, in common buildings, such as office buildings, the air conditioning system cannot adapt to the demand in real time, and there will be over ventilation, over cooling in summer and over heating in winter. Such control systems and methods not only make the comfort of personnel fail to meet the preset standards, but also increase the energy consumption of the HVAC system.

On demand ventilation system is a control method to determine the load and fresh air volume according to the quantity of personnel in the building, that is, determine the air supply volume, air supply temperature and fresh air ratio according to the specific needs of indoor personnel, so as to meet the comfort requirements of indoor personnel and maximize the energy saving of HVAC system. The system needs to determine the quantity of indoor personnel in real time. Therefore, if the quantity information of indoor personnel can be identified in real time and accurately, the air supply volume, air supply temperature and fresh air ratio can be determined accurately according to the quantity of personnel, and then the fresh air load can be determined according to the specific needs, so as to ventilate on demand and reduce energy consumption.

In the prior art, the CO2 concentration sensor, the infrared sensing technology and the computer vision technology are commonly used for personnel counting.

The principle of the personnel counting method based on the CO2 concentration sensor is to continuously measure the total amount of indoor CO2 concentration according to the CO2 concentration sensor, and then analyze the quantity of indoor personnel in a certain period in combination with the measurement time and the total amount of C02 released by breathing of single personnel per unit time. This method has the following limitations: first, it takes a certain time for the accumulation and reduction of indoor CO2 concentration, the indoor CO2 concentration will not change in real time with the increase or decrease of indoor personnel, and has a certain continuity, so the sensitivity of this method is not high; second, the indoor CO2 concentration is not determined solely by the quantity of indoor personnel, but also affected by factors such as opening and closing doors and windows, fresh air input of the HVAC system, so the accuracy of this method is not high; third, when the distribution of indoor personnel is uneven, the distribution of CO2 concentration is also uneven, the monitoring of the CO2 concentration sensor does not represent the average level of the indoor CO2 concentration, but the arrangement of multiple CO2 concentration sensors will increase the cost.

The personnel counting method and system based on the infrared sensing technology are the most common in daily life and are often applied to the access control system. Its principle is relatively simple. When personnel enter the channel equipped with infrared sensors, the personnel will block the light emitted by the infrared transmitter and make the infrared sensor unable to receive the optical signal, once this intermittent occurs, it is regarded as personnel passing through the channel. However, its limitations are as follows: first, it can only record the quantity of personnel, but cannot accurately obtain more specific information such as personnel gender, height and weight, when this method is applied to the on-demand ventilation system, it cannot obtain the metabolic rate and calorific value of indoor personnel; second, when multiple personnel pass through the channel simultaneously or continuously, the personnel counting method will misjudge and the accuracy is not high; third, when the goods carried by personnel block the light emitted by the infrared sensor, multiple judgments will occur using this method.

The personnel counting method based on the computer vision technology is to arrange cameras indoors and monitor the quantity of indoor personnel in real time according to the dynamic recognition technology. This method has high accuracy, but it still has the following limitations: first, real-time monitoring with indoor cameras will involve privacy problems, which cannot be avoided; second, at present, the field of view of cameras in the market is limited, and there will be a blind area during monitoring. arranging multiple cameras without blind angle monitoring will increase the cost; third, the computer vision technology is easily affected by useless light sources, when there are many indoor light sources, the accuracy of this method is not high.

SUMMARY OF THE DISCLOSURE

In order to solve the problems existing in the prior art, the disclosure provides indoor personnel information identifying apparatus and method for assisting an air conditioning system of on-demand air supply. The apparatus identifies the specific information such as gender, height and weight of indoor personnel, and predicts the metabolic rate and calorific value of indoor personnel based on the above information, the above information can be used to assist the air conditioning system to calculate the indoor real-time fresh air load, real-time air supply temperature and air supply volume for reference, so as to achieve the effect of reducing energy consumption under the condition of ensuring good indoor air quality and high personnel comfort.

In order to achieve the above purpose, the disclosure provides the following technical scheme: an indoor personnel information identifying apparatus for assisting an air conditioning system of on-demand air supply, includes: a data acquisition device, an information processing device and an information display device; the data acquisition device is configured to acquire weight information and shoe image information of personnel passing through the data acquisition device in real time and send the weight information and the shoe image information to the information processing device; the information processing device is configured to obtain a real-time number/quantity of indoor personnel and thereby predict a total calorific value (also referred to as heat generation quantity) of the indoor personnel according to the weight information and the shoe image information, and obtain recommended air supply parameter information for the air conditioning system according to the total calorific value of the indoor personnel; and the information display device is configured to receive personnel information processed by the data acquisition device and the information processing device and the recommended air supply parameter information, and display the personnel information and the recommended air supply parameter information.

In an embodiment, the data acquisition device includes a weighing sensor and a contact-type scanner; the weighing sensor is configured to collect the weight information of the personnel passing through the weighting sensor and send the weight information to the information processing device; and the contact-type scanner is configured to scan shoes of the personnel passing through the weighting sensor to obtain the shoe image information of the personnel and send the shoe image information to the information processing device.

In an embodiment, the contact-type scanner includes touch-type photosensitive elements.

In an embodiment, the information processing device includes an image processing module, an analysis module, a counting module and a data transmission module; the image processing module is configured to receive the shoe image information and obtain shoe length information and footprint orientation information of the personnel according to pixels of the shoe image information;

The counting module is configured to count the indoor personnel according to the footprint orientation information to thereby obtain the real-time number of the indoor personnel when the data acquisition device acquires the weight information;

The analysis module is configured to predict the total calorific value of the indoor personnel according to the real-time number of the indoor personnel and calculate the recommended air supply parameter information for the air conditioning system according to the total calorific value of the indoor personnel; and The data transmission module is configured to transmit the personnel information and the recommended air supply parameter information to a computer and a ventilation and air conditioning controller.

In an embodiment, the analysis module includes a personnel gender information predictor, a load calculator and an air supply parameter calculator;

The personnel gender information predictor is configured to predict gender information of the indoor personnel according to the shoe length information and the weight information and send the gender information to the load calculator;

The load calculator is configured to predict a calorific value of each the indoor personnel according to the gender information and obtain the total calorific value of the indoor personnel according to the calorific value of each the indoor personnel combined with the real-time number of the indoor personnel; and The air supply parameter calculator is configured to calculate the recommended air supply parameter information for the air conditioning system according to the total calorific value of the indoor personnel under a condition of the real-time number of the indoor personnel.

In an embodiment, the analysis module further includes a personnel height information predictor, configured to receive the shoe length information outputted by the image processing module, predict height information of the personnel passing through the data acquisition device according to the shoe length information, and send the height information to the information display device.

In an embodiment, the personnel passing through the data acquisition device is recognized as a man when the weight information is greater than or equal to 65 kilograms (kg) and the shoe length information is greater than or equal to 245 millimeters (mm); or the personnel passing through the data acquisition device is recognized as a woman when the weight information is less than 65 kg and the shoe length information is less than 245 mm.

In an embodiment, a calorific value of an adult man during sitting still is 108 watts (w), and a calorific value of an adult woman is 85% of that of the adult man.

In an embodiment, the information display device includes an electronic display screen.

The disclosure also provides an indoor personnel multi-level information identifying method for assisting an air conditioning system of on-demand air supply, including the following steps:

S1, acquiring the weight information and the shoe image information of the personnel entering a room, and obtaining footprint length information and footprint orientation information of the personnel according to the shoe image information;

S2, obtaining the real-time number of indoor personnel according to the footprint orientation information, predicting height information of the personnel according to the footprint length information, and predicting gender information of the indoor personnel according to the weight information and the footprint length information;

S3, predicting a calorific value of each the indoor personnel according to the gender information of the indoor personnel, and obtaining a real-time heat load (also referred to as the total calorific value) of the indoor personnel according to the calorific value of each the indoor personnel combined with the real-time number of the indoor personnel; and S4, calculating the recommended air supply parameter information for the air conditioning system according to the real-time heat load of the indoor personnel.

Compared with the prior art, the disclosure has at least the following beneficial effects:

The disclosure provides an indoor personnel information identifying apparatus for assisting the air conditioning system of on-demand air supply, by monitoring and identifying the number of personnel entering the room from the room entrance by collecting the weight information and the shoe image information of the personnel passing through the data acquisition device, which has high accuracy; by judging dynamic information of personnel entering or leaving the room through the information processing device in real time, and adjusting the count value in real time, which has high sensitivity; the information processing device of the disclosure has the function of calculating the calorific value of each the indoor personnel by identifying the gender, height and weight information of each the indoor personnel, that is, the indoor personnel information identifying apparatus of the disclosure can identify the multi-level information of the indoor personnel, involving wider dimensions and more complete functions; By calculating the total number of the indoor personnel and predicting the total calorific value of the indoor personnel, the disclosure can assist the building indoor HVAC system to supply air on demand, and save energy under the condition of ensuring personnel comfort and indoor air quality;

The arrangement of the indoor personnel information identifying apparatus provided by the disclosure is not affected by the indoor layout and room structure, the arrangement is convenient and flexible, does not affect the normal life and work of the indoor personnel, and does not involve privacy problems;

The component cost of the indoor personnel information identifying device provided by the disclosure is low, the structure is simple, the layout occupies a small indoor area of the building, and the manufacturing cost and operation and maintenance cost are lower.

DETAILED DESCRIPTION OF EMBODIMENTS

The disclosure is further described below in combination with the accompanying drawings and specific embodiments. It should be noted that the disclosure is not limited to the following specific embodiments, and all equivalent transformations based on the technical scheme of the application fall within the protection scope of the disclosure.

Figure 1:
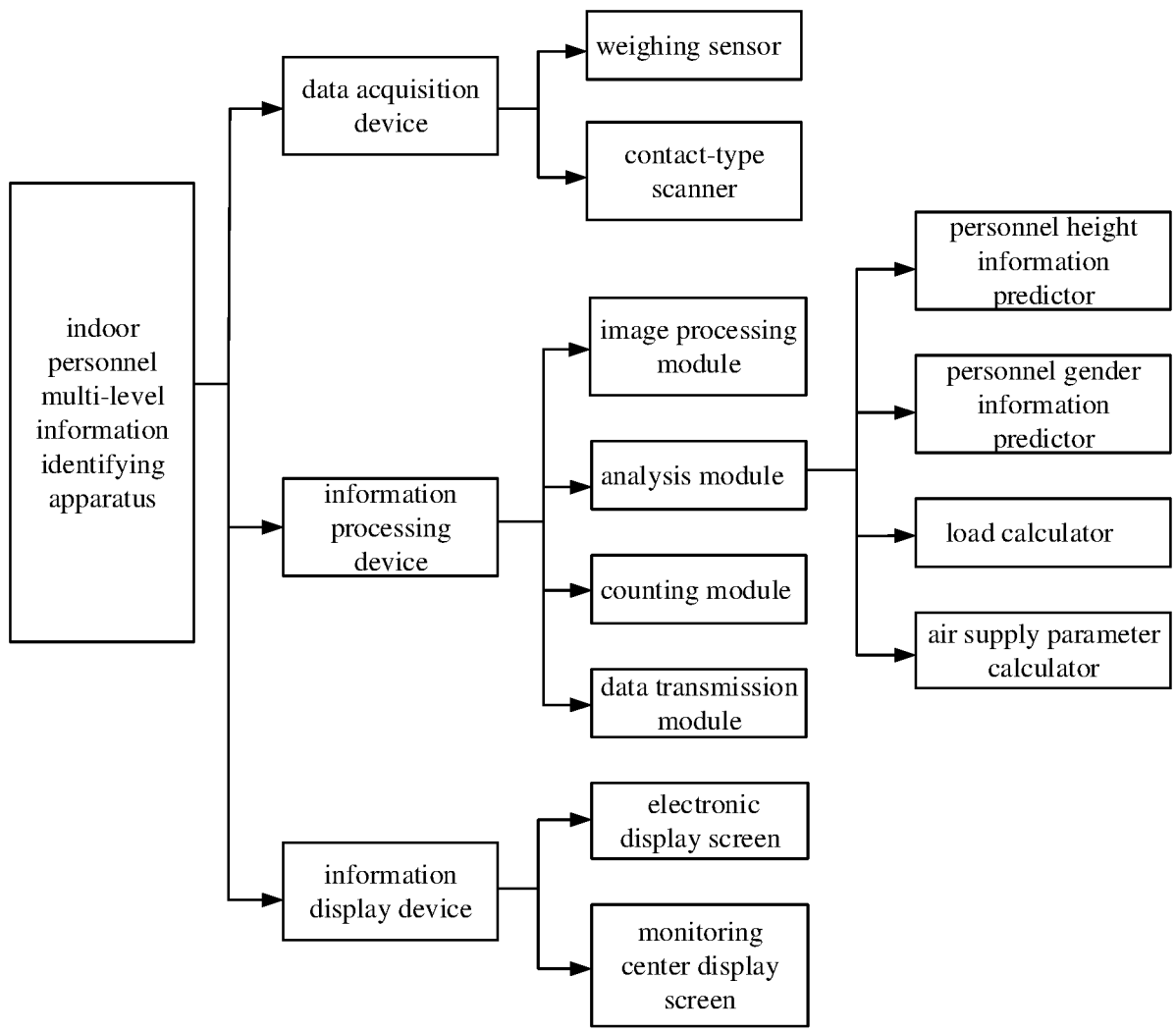
FIG. 1 is a schematic structural diagram of an indoor personnel information identifying apparatus according to an embodiment of the disclosure.

As shown in FIG. 1, an embodiment of the disclosure provides an indoor personnel information identifying apparatus (also referred to as indoor personnel multi-level information identifying apparatus, and referred to as identifying apparatus for short) for assisting an air conditioning system of on-demand air supply, the identifying apparatus includes a data acquisition device, an information processing device and an information display device. For example, a shape of the identifying apparatus of the disclosure is a flat rectangular hexahedron, which is arranged at the necessary channel of the room, can be embedded in the floor or laid on the floor surface, so as to achieve the purpose of counting personnel while passing through the channel. Because the collection of multi-dimensional information can be realized only when the personnel pass through the identifying apparatus proposed by the disclosure, the personnel of the disclosure represent personnel who contacts the identifying apparatus and pass through the identifying apparatus when passing through the necessary channel of the room.

The data acquisition device and the information processing device are arranged inside the identifying apparatus. The information display device can be disposed on an upper surface of an outer housing of the identifying apparatus to display information with an electronic display screen; it can also be separately disposed outside of the outer housing and set at a position convenient for the person to see; it can also directly use the wireless communication technology to realize the wireless data transmission between the information processing device and a ventilation and air conditioning controller of the air conditioning system, and display the information on a computer.

1. Data Acquisition Device

The data acquisition device includes a weighing sensor and a contact-type scanner, which is configured to collect whether the personnel enter or leave the room, the weight information of the personnel and the shoe image information of the personnel in real time, and send the above information to the information processing device.

1.1 Weighing Sensor

The weighing sensor is also called the load sensor or the weight sensor. Its working principle is to convert the weight signal or the pressure signal into electrical signal. The weighing sensor is configured to sense whether the personnel passes through the weighing sensor; if the personnel passes through the weighing sensor, the weight information of the personnel is collected and sent to the information processing device.

Preferably, the weighing sensor adopts metal resistance strain gauges to form a measuring bridge circuit, which is made by using the principle that the metal resistance wire is stretched and becomes thinner under the action of tension and the resistance is increased, that is, the effect that the metal resistance is changed with the strain. The component has been developed very mature in the market, with simple structure and low cost.

1.2 Contact-Type Scanner

The contact-type scanner, also known as the contact-type image sensing device, is configured to scan shoes of the personnel passing through the weighting sensor to obtain the shoe image information (also referred to as image signal) of the personnel, and convert the image signal into an electrical signal and transmit it to the information processing device;

Preferably, the contact-type scanner adopts touch-type photosensitive elements for photosensitivity, and 300 to 600 red, green and blue LED sensors are arranged under the scanning platform to generate a white light source. When the scanned object directly contacts the scanning platform, the reflected light irradiated by the internal light source on the scanned object is photosensitized, and the image signal is transformed into an electrical signal. The element has been developed very mature in the market. It has the advantages of small volume, light weight and low production cost. It is widely used in fax machines, scanners, printers and other equipment.

It should be noted that only when the weighting sensor receives the weight information of the personnel, the shoe image information of the personnel collected by the contact-type scanner is valid.

2. Information Processing Device

The information processing device includes an image processing module, an analysis module, a counting module and a data transmission module. The image processing module is configured to process the shoe image information of the personnel and identify shoe length information (also referred to as footprint length information) and footprint orientation information of the personnel. The counting module is configured to count the indoor personnel according to the footprint orientation information to thereby obtain the real-time number of the indoor personnel according to whether the weighting sensor receives the pressure signal. The analysis module is configured to predict the height information of the personnel according to the shoe length information of the personnel, the analysis module is further configured to predict the gender information of the personnel in combination with the shoe length information and the weight information of the personnel, so as to predict calorific value of the personnel, calculate the total load (also referred to as total calorific value or real-time heat load) of the indoor personnel in combination with the real-time number of the indoor personnel calculated by the counting module, and then calculate the recommended air supply parameter information such as fresh air volume and air supply temperature of the air conditioning system.

2.1 Image Processing Module

The image processing module is configured to receive the shoe image information of the personnel outputted from the contact-type scanner, collect two farthest pixels in the shoe image information to calculate path information and thereby to obtain shoe length information of the personnel.

On the other hand, the image processing module integrates edge pixels of the shoe image information of the personnel, constructs all edge pixels into the shape of the shoe, respectively connects the two farthest pixels and the two nearest pixels of the edge pixels in the shoe image information to make two path vectors, and the included angle formed by the intersection of the two path vectors shall be a right angle, the right angle cut the longest path in the image formed by the two farthest pixels into two segments. The longer segment and the shorter segment are defined as long end and short end respectively. In addition, reference boundaries close to indoor and outdoor in the overall image boundary are defined. When the long end is closer to the reference boundary close to indoor than the short end, it can be judged that the footprints face the room; When the long end is closer to the reference boundary close to outdoor than the short end, it can be judged that the footprints are back to the room. Through the above image analysis process, we can get the footprints orientation information, and judge the increase or decrease of the number of personnel in the room according to the footprint orientation information. If the footprints face the room, it is judged as personnel entering the room; if the footprints back to the room, it is judged as personnel leaving the room, that is, it is judged as personnel entering and leaving the room.

It is worth mentioning that, in some embodiments, the image processing module is a software module which is stored in one or more memories, and executable by one or more processors coupled to the one or more memories.

2.2 Counting Module

The counting module is configured to calculate the indoor personnel according to the pressure signal collected by the weighing sensor when the personnel entering or leaving the room and the footprint orientation information, receive the weight information of the personnel obtained by the weighing sensor and the footprint orientation information obtained by the image processing module, calculate and obtain the real-time number of the indoor personnel, and transmit the real-time number of the indoor personnel to the analysis module and the information display device.

When there is no one in the room, the initial value of the counting module is zero. When the weighting sensor collects the weight information of the personnel, combined with the footprint orientation information, when the footprints face the room, the count value of the counting module is + 1, that is, one additional personnel in the room; On the contrary, when the footprints are back to the room, the count value of the counting module is - 1, that is, one personnel in the room is reduced.

It is worth noting that the counting module will change the count value of the counting module only when it receives the weight information of the weighting sensor and the footprint orientation information of the image processing module at the same time;

It is worth mentioning that, in some embodiments, the counting module is a software module which is stored in one or more memories, and executable by one or more processors coupled to the one or more memories.

2.3 Analysis Module

The analysis module is configured to receive the weight information of the personnel outputted by the weighting sensor and the shoe length information of the personnel calculated by the image processing module to predict the gender of the personnel, and obtain the calorific value of the personnel, obtain the real-time heat load of the indoor personnel in combination with the real-time number of the indoor personnel outputted by the counting module, and obtain a real-time load of air conditioner in combination with the real-time number of the indoor personnel and the total calorific value of the indoor personnel, calculate the fresh air volume, air supply temperature and other air supply parameters as the recommended air supply parameter information according to the real-time load of the air conditioner and send them to the information display device;

It is worth mentioning that, in some embodiments, the analysis module is a software module which is stored in one or more memories, and executable by one or more processors coupled to the one or more memories.

The analysis module includes a personnel height information predictor, a personnel gender information predictor, a load calculator and an air supply parameter calculator.

2.3.1 the personnel height information predictor is configured to predict the personnel height information according to the shoe length information; receive the shoe length information of the personnel outputted by the image processing module, predict the height information of the personnel passing through the identifying apparatus according to the shoe length information and in combination with the general law of "generally, the ratio of adult height to footprint length is 7:1", record and send the height information to the personnel gender information predictor and load calculator. It is worth noting that the height prediction is only a fuzzy prediction;

2.3.2 The personnel gender information predictor is configured to obtain the shoe length information outputted by the image processing module and the weight information outputted by the weighting sensor, predict the gender information of the personnel according to the weight information and the shoe length information, and send it to the load calculator;

Specifically, the prediction method of the gender information is combined with the average weight, height and other information of adult men and women in China counted by *the report on nutrition and chronic diseases of Chinese residents (2020)* issued by the China National Health Commission, the definition: when the personnel weight is greater than or equal to 65 kilograms (kg) and the shoe length is greater than or equal to 245 millimeters (mm), the personnel is recognized as a man; when the personnel weight is less than or equal to 65 kg and the shoe length is less than 245 mm, the personnel is recognized as woman.

2.3.3 The load calculator is configured to receive the gender information of the personnel, predict the metabolic rate and calorific value of the personnel according to the gender information, and obtain the total load of the indoor personnel in combination with the real-time number of the indoor personnel calculated by the counting module;

Specifically, in *ASHRAE standard 55-2020*, "the calorific value of adult men during sitting still is about 108 watts (w), and the calorific value of adult women is 85% of that of adult men";

Further, the load calculator inputs the number information of the indoor personnel and gender information of the indoor personnel into a heat load calculation formula through the controller to calculate the real-time heat load of the indoor personnel:

$$Q = 0.85*n1*q + n2*q.$$

Where, Q (w) is the real-time heat load of the indoor personnel, n1 is the number of the indoor women, n2 is the number of the indoor men, and q is the calorific value of one adult man (w).

2.3.4 The air supply parameter calculator receives the real-time load of the air conditioner, calculates the specific values of air supply parameters such as air volume and air supply temperature under the real-time load of indoor personnel by using the relationship among the real-time load, air supply volume and air supply temperature difference, and transmits them to the information display device.

Further, the air supply parameter calculator according to the heat load of the indoor personnel and the following formula:

$$Q = c_p * m * \Delta t,$$

[0071] where, Q is heat load (w) of the indoor personnel, $c_p$ is air constant pressure specific heat (w/kg. °C), m is air supply volume (m³/h), ΔT is the supply air temperature difference (°C), and the recommended air supply parameter information such as supply air volume and supply air temperature can be calculated.

2.4 Data Transmission Module

The data transmission module is configured to upload personnel information such as including the weight, height and gender of the personnel passing through the identifying apparatus, the real-time number of the indoor personnel and the total calorific value of the indoor personnel and corresponding air conditioning working condition parameters (also referred to as recommended air supply parameter information) such as including air volume, air temperature and air speed of the air conditioning system to the computer and ventilation and air conditioning controller by using wireless data transmission technology to realize remote display and automatic control, and remotely display relevant data in the information display device or air conditioning control panel.

It is worth mentioning that, in some embodiments, the data transmission module is a software module which is stored in one or more memories, and executable by one or more processors coupled to the one or more memories.

3. Information Display Device

The information display device is configured to receive the personnel information processed by the data acquisition device and information processing device and the recommended air supply parameter information, and display the number of indoor personnel, air supply parameters and other numerical information; when personnel passes through the identifying apparatus, information such as the personnel weight, predicted height, predicted gender, etc. is displayed.

The main purpose of the information display device is to provide indoor personnel with reference values for accurately controlling the air volume, air temperature and air speed of the air conditioning system.

The information display device presents data information with an electronic display screen.

For a large central air conditioning system, the information display device can be further developed and expanded into a monitoring center display screen. The monitoring center display screen uses wireless data transmission technology to receive the information transmitted from the information processing device and is configured to provide real-time regulation signals corresponding to personnel information to the staff in the equipment control room, For the management personnel of the air conditioning system to view and control artificially.

Figure 2:
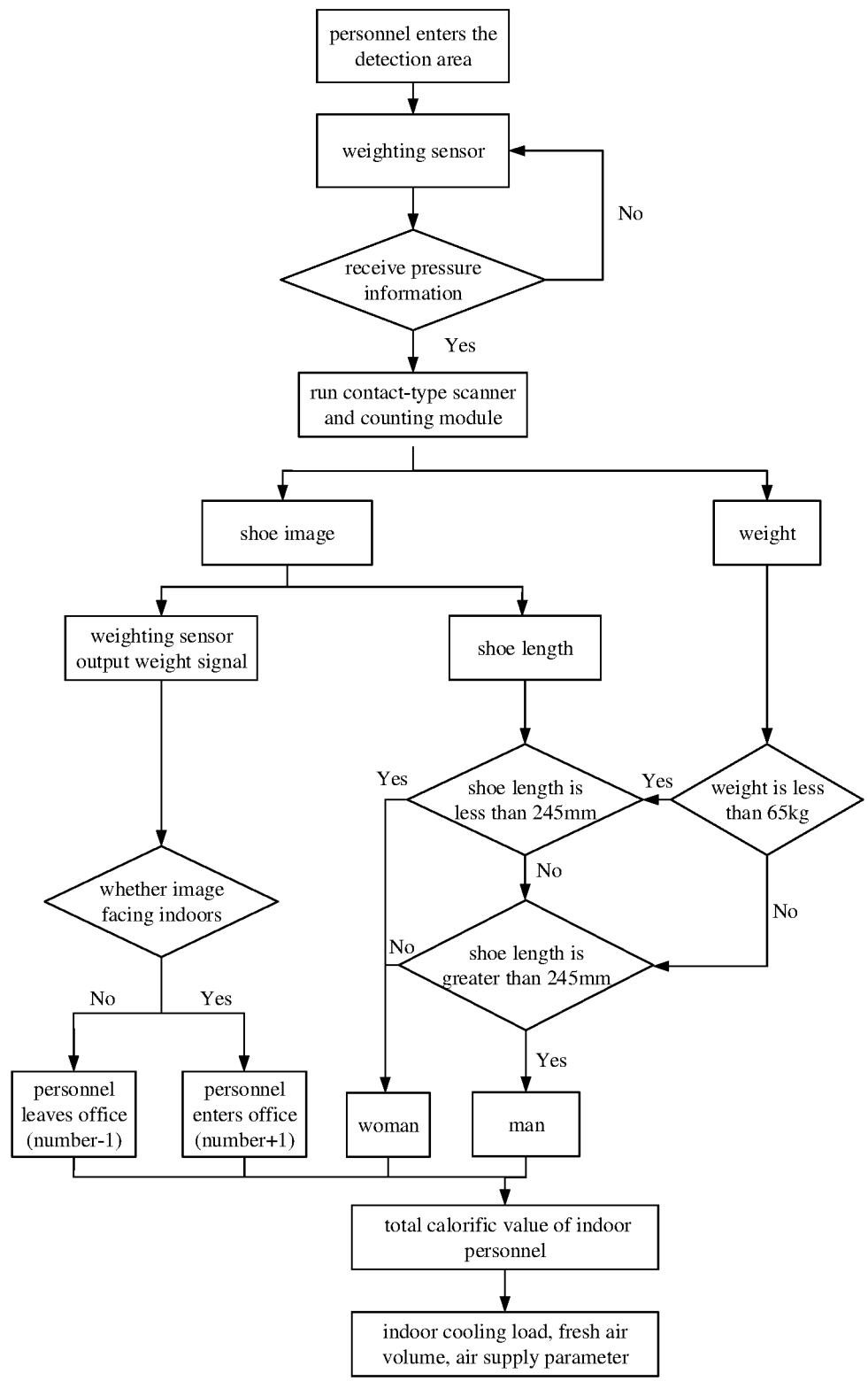
FIG. 2 is a flowchart of running of the indoor personnel information identifying apparatus according to the embodiment of the disclosure.

As shown in FIG. 2, the disclosure provides an indoor personnel multi-level information identifying method for assisting the air conditioning system of on-demand air supply, and the specific steps are as follows:

1. The weighting sensor senses and collects the weight information of the personnel entering the room, and the contact-type scanner collects the shoe image information of the personnel;
2. The image processing module receives the shoe image information, obtains the footprint length information and the footprint orientation information of the personnel through pixel value analysis, sends the footprint length information to the analysis module, and sends the footprint orientation information to the counting module;
3. The counting module receives the weight information sent by the weighting sensor, counts the indoor personnel in real-time according to the footprints facing or backing to the room when the personnel enter or leave the room, and thereby to obtain the real-time number of indoor personnel and sends it to the analysis module;
4. The analysis module receives the real-time number of indoor personnel, the weight information and the footprint length information;
5. The personnel height predictor of the analysis module predicts the height information of the personnel according to the footprint length information;
6. The person gender prediction unit of the analysis module predicts the gender information of the personnel according to the weight information and the footprint length information;
7. The load calculator of the analysis module calculates the calorific value of each the indoor personnel according to the gender information, and calculates the real-time heat load of the indoor personnel according to the real-time number of indoor personnel and the calorific value of each the indoor personnel;
8. The air supply parameter calculator of the analysis module calculates the recommended air supply parameter information such as fresh air volume, air supply temperature of the air conditioning system according to the real-time heat load of the indoor personnel;
9. The information display device receives all the above information and displays the weight information and the height information when the personnel passes through the identifying apparatus; at the same time, the information display device continuously displays the number of indoor personnel, real-time heat load of the indoor personnel, recommended fresh air volume and recommended air supply temperature.

Solutions to adverse situations in specific implementation:

1. If the contact-type scanner collects the image information of an object, but at the same time, the weighting sensor has no input of the weight information of the personnel, that is, it does not sense personnel passing through the device surface, the collected image information is invalid and no subsequent processing is performed. This setting aims to prevent misjudgment caused by wrong scanning of the contact-type scanner caused by shadows of other objects;
2. If a woman wearing high-heeled shoes passing through the device surface, the contact-type scanner collects discontinuous image information of the high-heeled shoe prints, it is deemed that this situation occurs. The analysis module skips the step of predicting the height of the personnel, directly determines that the passing personnel is women, and the real-time heat load of the personnel is calculated based on the calorific value of the woman;
3. When more than one personnel enter or leave the room through the identifying apparatus at the same time, that is, when the weight information collected by the weighting sensor is greater than 90 kg, and there are more than two independent images in the shoe image information collected by the contact-type scanner, this situation is deemed to occur. Otherwise, the information collected by the device is invalid and will not be processed.

What is claimed is:

1. An indoor personnel information identifying apparatus, for assisting an air conditioning system of on-demand air supply, comprising: a data acquisition device, an information processing device and an information display device;
    wherein the data acquisition device is configured to acquire weight information and shoe image information of personnel passing through the data acquisition device in real time and send the weight information and the shoe image information to the information processing device;
    wherein the information processing device is configured to obtain a real-time quantity of indoor personnel and thereby predict a total calorific value of the indoor personnel according to the weight information and the shoe image information, and obtain recommended air supply parameter information for the air conditioning system according to the total calorific value of the indoor personnel; and
    wherein the information display device is configured to receive personnel information processed by the data acquisition device and the information processing device and the recommended air supply parameter information, and display the personnel information and the recommended air supply parameter information.

2. The indoor personnel information identifying apparatus according to claim 1, wherein the data acquisition device comprises a weighing sensor and a contact-type scanner;
    wherein the weighing sensor is configured to collect the weight information of the personnel passing through the weighting sensor and send the weight information to the information processing device; and
    wherein the contact-type scanner is configured to scan shoes of the personnel passing through the weighting sensor to obtain the shoe image information of the personnel and send the shoe image information to the information processing device.

3. The indoor personnel information identifying apparatus according to claim 2, wherein the contact-type scanner comprises touch-type photosensitive elements.

4. The indoor personnel information identifying apparatus according to claim 1, wherein the information processing device comprises an image processing module, an analysis module, a counting module and a data transmission module;
    wherein the image processing module is configured to receive the shoe image information and obtain shoe length information and footprint orientation information of the personnel according to pixels of the shoe image information;
    wherein the counting module is configured to count the indoor personnel according to the footprint orientation information to thereby obtain the real-time quantity of the indoor personnel when the data acquisition device acquires the weight information;
    wherein the analysis module is configured to predict the total calorific value of the indoor personnel according to the real-time quantity of the indoor personnel and calculate the recommended air supply parameter information for the air conditioning system according to the total calorific value of the indoor personnel; and
    wherein the data transmission module is configured to transmit the personnel information and the recommended air supply parameter information to a computer and a ventilation and air conditioning controller.

5. The indoor personnel information identifying apparatus according to claim 4, wherein the analysis module comprises a personnel gender information predictor, a load calculator and an air supply parameter calculator;
    wherein the personnel gender information predictor is configured to predict gender information of the indoor personnel according to the shoe length information and the weight information and send the gender information to the load calculator;
    wherein the load calculator is configured to predict a calorific value of each the indoor personnel according to the gender information and obtain the total calorific value of the indoor personnel according to the calorific value of each the indoor personnel combined with the real-time quantity of the indoor personnel; and
    wherein the air supply parameter calculator is configured to calculate the recommended air supply parameter information for the air conditioning system according to the total calorific value of the indoor personnel under a condition of the real-time quantity of the indoor personnel.

6. The indoor personnel information identifying apparatus according to claim 5, wherein the analysis module further comprises:
    a personnel height information predictor, configured to receive the shoe length information outputted by the image processing module, predict height information of the personnel passing through the data acquisition device according to the shoe length information, and send the height information to the information display device.

7. The indoor personnel information identifying apparatus according to claim 5, wherein the personnel passing through the data acquisition device is recognized as a man when the weight information is greater than or equal to 65 kilograms (kg) and the shoe length information is greater than or equal to 245 millimeters (mm); or
    the personnel passing through the data acquisition device is recognized as a woman when the weight information is less than 65 kg and the shoe length information is less than 245 mm.

8. The indoor personnel information identifying apparatus according to claim 5, wherein a calorific value of an adult man during sitting still is 108 watts (w), and a calorific value of an adult woman is 85% of that of the adult man.

9. The indoor personnel information identifying apparatus according to claim 1, wherein the information display device comprises an electronic display screen.

10. An indoor personnel multi-level information identifying method for assisting an air conditioning system of on-demand air supply, based on the indoor personnel information identifying apparatus according to claim 1, comprising:
- acquiring the weight information and the shoe image information of the personnel entering a room, and obtaining footprint length information and footprint orientation information of the personnel according to the shoe image information;
- obtaining the real-time quantity of indoor personnel according to the footprint orientation information, predicting height information of the personnel according to the footprint length information, and predicting gender information of the indoor personnel according to the weight information and the footprint length information;
- predicting a calorific value of each the indoor personnel according to the gender information of the indoor personnel, and obtaining the total calorific value of the indoor personnel according to the calorific value of each the indoor personnel combined with the real-time number of the indoor personnel; and
- calculating the recommended air supply parameter information for the air conditioning system according to the total calorific value of the indoor personnel.

\* \* \* \* \*